United States Patent [19]

Pritchard

[11] Patent Number: 4,612,567
[45] Date of Patent: Sep. 16, 1986

[54] TELEVISION RECEIVER USING NON-INTERLACED SCANNING FORMAT WITH VERTICAL DETAIL ENHANCEMENT AND MOTION COMPENSATION

[75] Inventor: Dalton H. Pritchard, Princeton, N.J.

[73] Assignee: RCA Corporation, Princeton, N.J.

[21] Appl. No.: 607,121

[22] Filed: May 3, 1984

[51] Int. Cl.[4] .................. H04N 9/78; H04N 7/01
[52] U.S. Cl. ..................... 358/11; 358/31; 358/105
[58] Field of Search ............. 358/11, 31, 12, 105

[56] References Cited

U.S. PATENT DOCUMENTS

| | | | |
|---|---|---|---|
| 4,050,084 | 9/1977 | Rossi | 358/31 |
| 4,218,700 | 8/1980 | Kashigi | 358/31 |
| 4,241,363 | 12/1980 | Maeyama et al. | 358/31 |
| 4,295,160 | 10/1981 | Lagoni | 358/31 |
| 4,498,100 | 2/1985 | Bunting et al. | 358/31 |
| 4,530,004 | 7/1985 | Achiha et al. | 358/11 |
| 4,553,158 | 11/1985 | Acamporn | 358/31 |

FOREIGN PATENT DOCUMENTS

| | | |
|---|---|---|
| 3342530 | 5/1984 | Fed. Rep. of Germany . |
| 2049247 | 12/1980 | United Kingdom . |
| 2114848 | 8/1983 | United Kingdom . |

OTHER PUBLICATIONS

Article by M. Achiha et al., entitled "A Motion Adaptive High-Definition Converter for NTSC Color TV Signals", submitted to the 13th International Television Symposium in Montreaux, Canada, May 1983.

U.S. Patent Appln. Ser. No. 526,702, filed Aug. 26, 1983, entitled "Progressive Scan Television System Employing Vertical Detail Enhancement", by D. H. Pritchard, et al.

Primary Examiner—John W. Shepperd
Attorney, Agent, or Firm—P. J. Rasmussen; P. M. Emanuel; R. G. Coalter

[57] ABSTRACT

The television receiver displays the picture information of an interlaced signal, such as a baseband NTSC signal, in a non-interlaced scanning format. The NTSC signal is comb filtered in a line comb filter to extract a luminance representative component signal. When no motion occurs in the picture scene, vertical detail is added and substracted, respectively, from the luminance representative component signal to form first and second enhanced luminance signals, respectively. During each horizontal line interval of the NTSC signal, the corresponding portions of the first and the second signals contain luminance information capable of being displayed in consecutive non-interlaced scan lines, respectively, of the interlaced display. When motion is detected, vertical detail enhancement is diminished so that artifacts that may be more pronounced in the presence of motion, become less visible.

17 Claims, 6 Drawing Figures

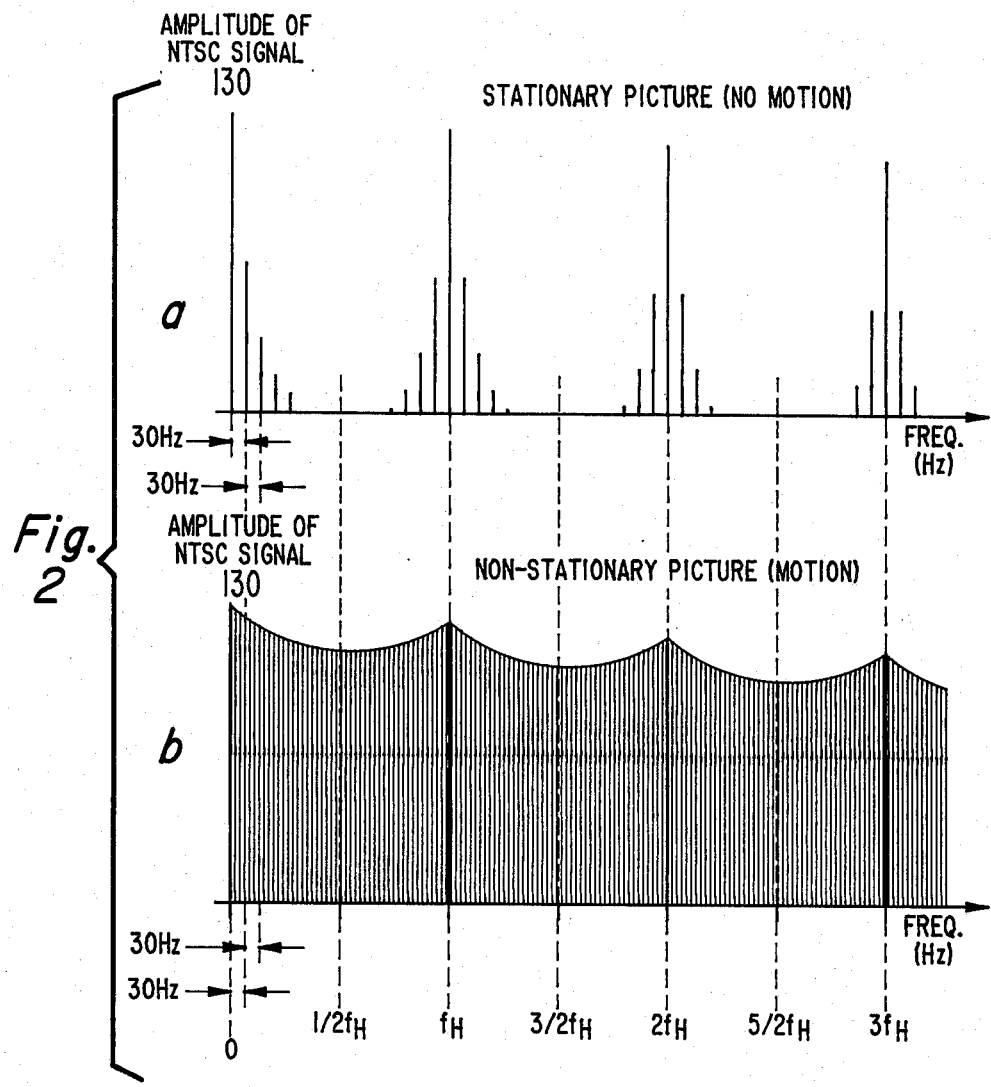

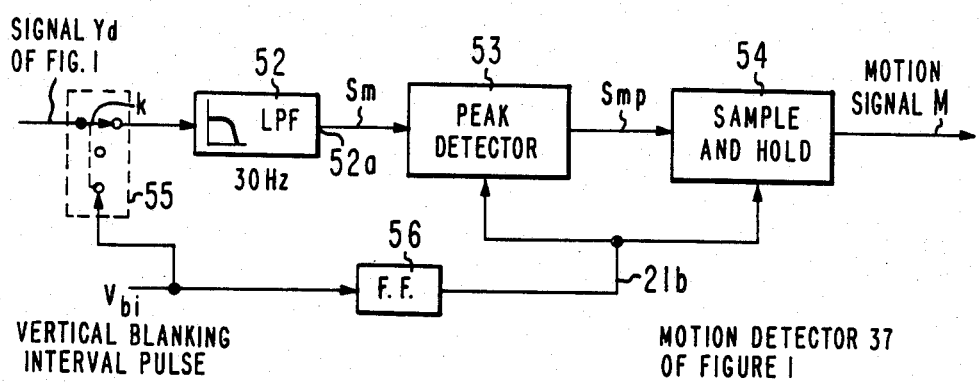
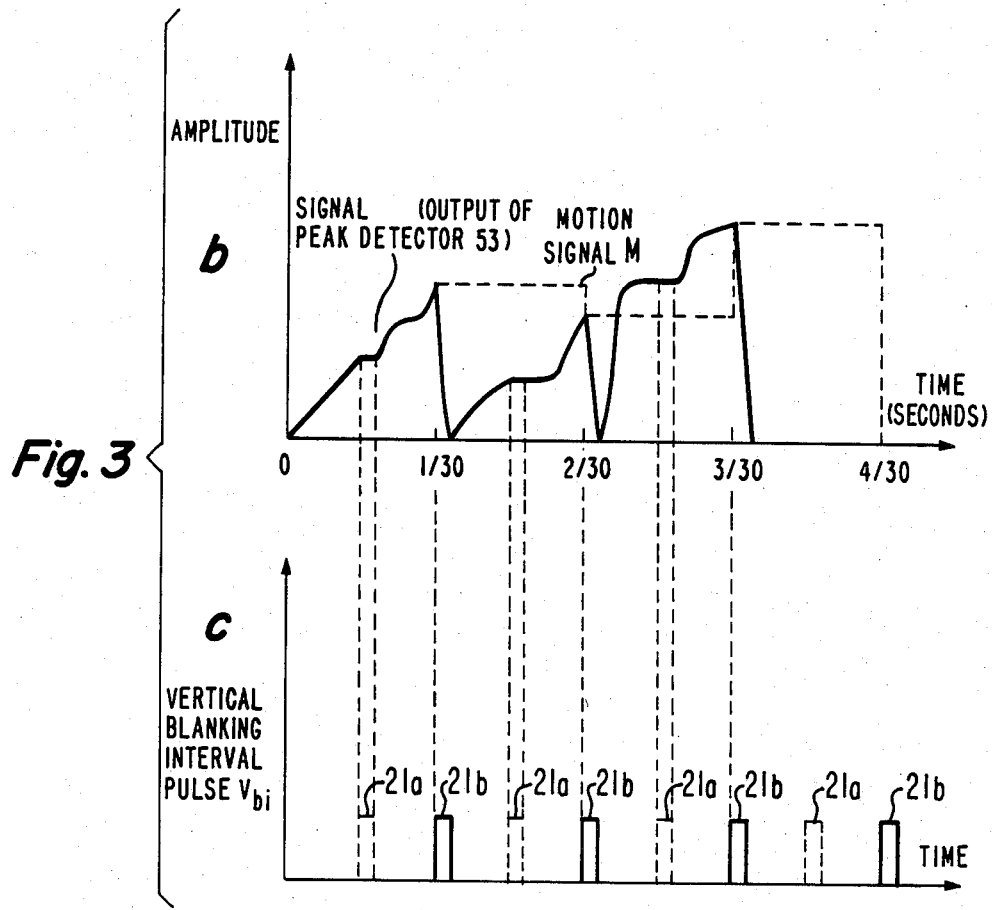

TELEVISION RECEIVER USING NON-INTERLACED SCANNING FORMAT WITH VERTICAL DETAIL ENHANCEMENT AND MOTION COMPENSATION

This invention relates to television systems and, more particularly, to television display apparatus, for displaying the picture information of a television signal that was produced by an interlaced scanning process, hereinafter referred to as the interlaced signal, in a non-interlaced scanning format.

BACKGROUND OF THE INVENTION

Television signals based on present day standards create visible artifacts on conventional television receivers and monitors. In broadcast systems such as the 525 line-per-frame, 30 frame-per-second 525/30 NTSC system or the 625/25 PAL system, artifacts occur because of the interlaced scanning process. This process divides the 525-line picture or frame of the NTSC standard into two successive 262½-line fields. The 262½ lines of one field are scanned in 1/60th of a second followed by scanning of an additional 262½ lines of another field with lines of the second field occupying the spaces between the lines of the first field. One subjective effect of this interlaced scan is to create in the presence of motion in the picture scene an apparent vertical line break-up motion of the lines of the raster known as "line crawl". The apparent drift is substantially more noticeable when viewing a wide-screen display at close range. Another well-known objectionable visible effect is interline flicker on line-to-line transitions that occurs because of the interlaced scanning format.

Recent interest in the development of high definition television systems (HDTV) has been directed towards techniques that are intended to enhance the subjective performance of present systems within the constraints of existing standards. One approach, a technique referred to as progressive scan, or non-interlaced scan, has been described in patent materials and literature. For example, all 525 scan lines (for 525 lines-per-field, 60 Hz) are scanned consecutively from the top of the display screen and downward to the bottom of the display screen during each vertical scanning interval of, for example, 1/60th of a second. Progressive scan results in the reduction of artifacts related to the interlaced scanning format, such as interline flicker and line crawl that exist in conventional two-to-one interlaced displays. The subjective effect is a more pleasing picture presentation to the viewer.

In U.S. patent application Ser. No. 526,702, filed Aug. 26, 1983, entitled, PROGRESSIVE SCAN TELEVISION SYSTEM EMPLOYING VERTICAL DETAIL ENHANCEMENT, in the name of D. H. Pritchard and W. E. Sepp (which issued Dec. 10, 1985, as U.S. Pat. No. 4,588,347), an apparatus for displaying the picture information of, for example, a baseband NTSC signal is disclosed. The television apparatus that is disclosed in the Pritchard et al. application generates, during each horizontal video line time of the NTSC signal, a pair of luminance information containing signals. The picture information that is produced in one of the pair of signals, during each horizontal video line time of the NTSC signal, is displayed in a first scan line of the display and that of the other is displayed immediately afterward in the next adjacent scan line below the first scan line. In order to display the luminance information that is included in both siqnals during one horizontal scan line time of the NTSC signal, each one is speeded up, or compressed. Thus, in the television apparatus of Pritchard et al., picture information is displayed in a given pair of scan lines during the same period in which picture information, in the standard interlaced television receiver, is displayed in only one scan line.

Each signal of the pair of luminance signals is generated using a line comb filter. Because of the interpolation, or the averaging process, that occurs in the summation process of the line comb filter, some loss of vertical detail occurs. Such loss of vertical detail may be noticeable in the section of the display where picture vertical transitions occur. The Pritchard et al. application discloses an approach for reinserting vertical detail signal components to compensate for the loss that occurs as a result of the averaging process. There, the vertical detail is obtained from the subtraction process in a comb filter source and reinserted in a specific manner to enhance the subjective vertical sharpness and to produce a "clean" subjective picture.

The non-interlaced scanning format reduces interline flicker and line crawl type artifacts that arise from the interlaced scanning format in standard television displays. However, artifacts caused by the interlaced scanning process at the source of the interlaced signal, such as at the television camera, are not eliminated by the non-interlaced scanning format of the television receiver. Furthermore, when vertical detail enhancement process is employed in the television receiver, such as disclosed in the Pritchard et al. application, the visibility of such source related artifacts may even be increased. Such artifacts are caused at the source of the interlaced television signal by the aliasing components that are included in the interlaced NTSC signal. The aliasing components in the interlaced NTSC signal are generated as a consequence of the overlapping of the field-to-field sidebands generated by the sampling process that is inherent in producing interlaced signals at the camera.

Because of the interlaced scanning format that is used at the source, the frequency spectrum of the signal that is produced by the television camera includes integer multiples of the horizontal scanning frequency of illustratively 15734 Hz with sidebands, of illustratively multiples of 30 Hz, the vertical rate, above and below each multiple of the horizontal scanning frequency. In processing a still image at the camera, the sidebands produced include frequencies that are spaced from the horizontal scanning frequency by integer multiples of 30 Hz. Because of the shape of the scanning spot, which is typically gaussian or cosine, at the camera, these sidebands may include aliasing components. These aliasing components are visible when the vertical components of moving objects are displayed in the television receiver display, and also when differences in the scene content due to television camera vertical panning occur from one field time to the immediately following one. Such differences in the scene are generally referred to as motion in the picture scene.

An aspect of the invention entails reduction of the vertical detail enhancement when motion occurs relative to the case when no motion occurs to reduce the visibility of the artifacts that may be caused by the camera aliasing edge components.

SUMMARY OF THE INVENTION

A television apparatus produces picture detail signal from a first component signal of a television signal. A motion detector produces motion signal from the television signal that is indicative of motion in the picture. A second signal that is representative of the first component signal is proportionately combined, with the picture detail signal, in accordance with the motion indicative signal, to form a third signal that contains enhanced picture detail of the first component signal.

BRIEF DESCRIPTION OF THE DRAWING

FIGS. 2a and b illustrate the frequency spectrum of an NTSC signal for stationary and for non-stationary pictures, respectively;

FIG. 3a illustrates a block diagram of a motion detector that generates the motion indicative signal;

FIGS. 3b and c are waveforms useful in explaining operation of the motion detector of FIG. 3a;

DETAILED DESCRIPTION OF THE INVENTION

Figure 1:
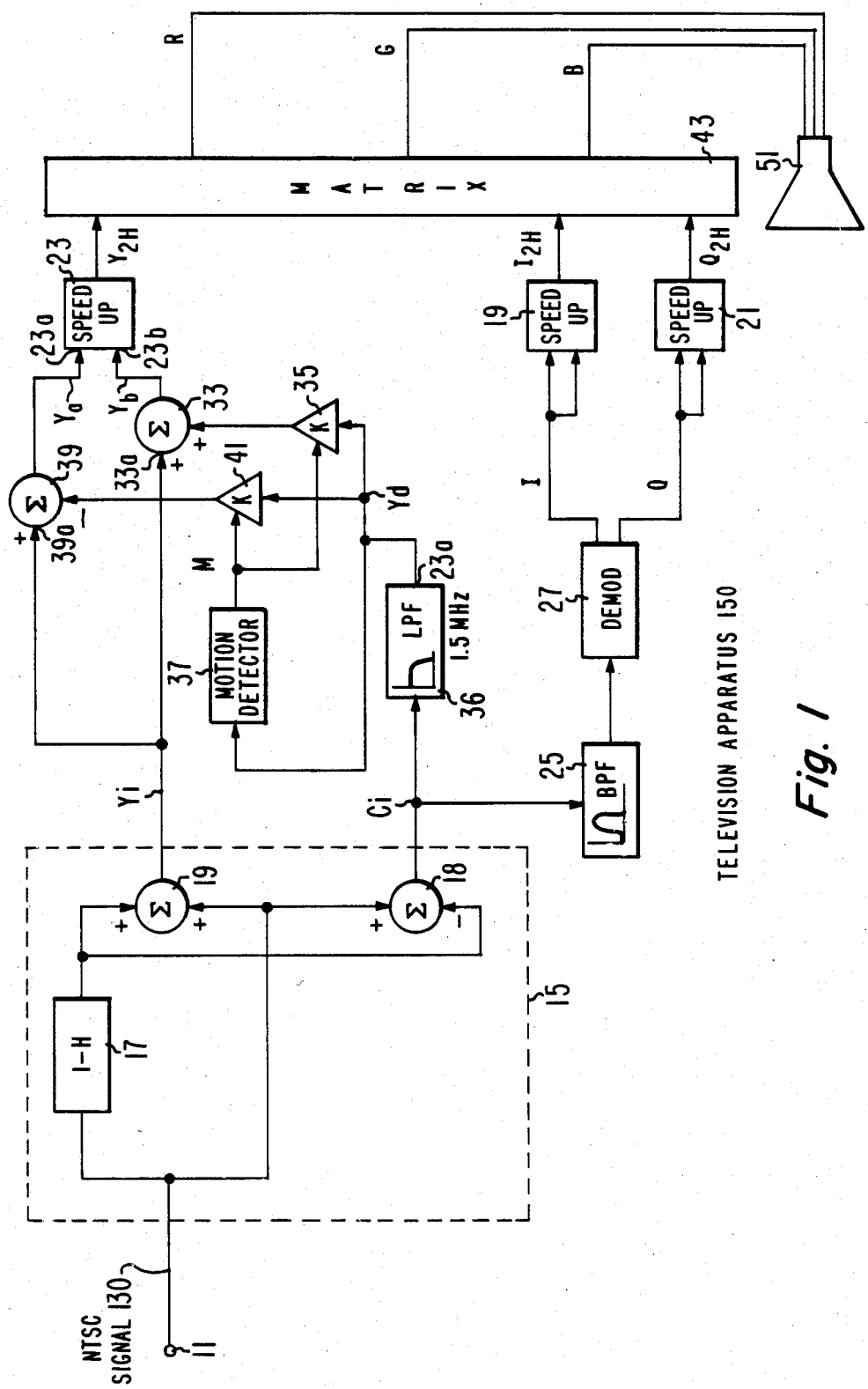
FIG. 1 illustrates a television apparatus of the invention that produces signals containing picture detail, in accordance with a motion indicative signal, for displaying the enhanced picture in non-interlaced scanning format.

Referring to FIG. 1, an analog, composite, interlaced-scan color television NTSC signal 130 is applied to a terminal 11 from a source which is not shown. The source of the analog signal may be the demodulated output of the intermediate-frequency (IF) stage of a standard television receiver. It should be noted that the present invention will be described with reference to an NTSC composite, interlaced, color television signal, however, it should be obvious to one of skill in the art that other composite, or component, interlaced color television systems, such as PAL, fall within the scope of the invention described herein.

NTSC signal 130 is applied to a separator 15 which, illustratively, may be a two-terminal transversal filter having a 1-H delay 17, also known as a comb filter. A 1-H delay is equal to the time required to scan a horizontal line in an NTSC signal, e.g., 63.5 μs. In separator 15 the 1-H delayed signal is combined in an adder 19 with NTSC signal 130 to form an interpolated signal Yi which is combed. Signal Yi represents an estimated signal between successive video lines. Signal Yi is the luminance-representative component of NTSC signal 130 having a frequency spectrum with signal energy concentrated in the vicinity of integer multiples of the line rate, (i.e., 15,734 Hz) and nulls of signal energy in the vicinity of odd integer multiples of one-half of the line rate.

Similarly, delayed and undelayed lines are applied to a subtractor 18 which provides a combed chrominance signal Ci representing a portion of the luminance information and the chrominance information having a frequency spectrum with signal energy concentrated in the vicinity of odd integer multiples of one-half of the line rate (i.e., 15,734 Hz) and nulls of signal energy in the vicinity of integer multiples of the line rate. Chrominance signal Ci from subtractor 18 is bandpass filtered in a bandpass filter 25 to provide the combed modulated chrominance information to a demodulator 27. Demodulator 27 of conventional design provides the demodulated I and Q signals to speed-up processors 19 and 21, respectively.

Speed-up processors 19 and 21 produce time-compressed I and Q signals compressed at a multiple (e.g., two-times) of the input rate. For each horizontal video line of NTSC signal 130, speed up processor 19, for example, generates two video lines of an $I_{2H}$ signal. Each of the two video lines of $I_{2H}$ signal contains the same I information as in the corresponding uncompressed video line of the I signal. The I information in each of the two video lines of $I_{2H}$ signal is speeded up to occupy ½ the time it occupies in the corresponding portion of the I signal. Speed up processor 19 generates, in a similar manner, a $Q_{2H}$ signal from the Q signal. Speed-up processors 19 and 21 may be implemented as described in U.S. patent application Ser. No. 526,701, entitled, PROGRESSIVE SCAN SPEED UP PROCESSOR, filed Aug. 26, 1983, in the name of W. E. Sepp, herein incorporated by reference. The twice rate $I_{2H}$ and $Q_{2H}$ signals are coupled to an I,Q,Y matrix 43 for generating R, G and B signals, as discussed later on.

Luminance signal Yi is coupled to an input terminal 39a of a subtractor 39 and to an input terminal 33a of an adder 33. Chrominance signal Ci is coupled through a low pass filter 36, having a cutoff frequency of illustratively 1.5 MHz to form a vertical detail enhancement signal Yd at a terminal 23a. As explained below, signal Yd reinserts the vertical details in luminance signal Yi that were reduced in the combining process conducted in adder 19. Signal Yd is representative of line to line differential picture detail in the vertical direction.

Signal Yd is coupled through a gain controlled device 35 that is described later on, to the other input terminal of adder 33. Adder 33 sums the signals at its respective input terminals to produce a $Y_b$ signal that provides luminance information, as described later on. Likewise, vertical detail signal Yd is coupled through a gain controlled device 41, illustratively similar to gain controlled device 35, to the other input terminal of subtractor 39 where it is subtracted from luminance signal Yi. The result of the subtraction in subtractor 39 is a $Y_a$ signal that also provides luminance information, as described later on.

Assume that the gain factor K of device 35 and device 41, respectively, is equal to 1. During each active video line time of NTSC signal 130, $Y_a$ signal contains substantially all the luminance vertical details, up to the cutoff frequency of filter 36, of the portion of NTSC signal 130 that was coupled to terminal 11 during the immediately preceding active video line time of NTSC signal 130. Simultaneously, $Y_b$ signal contains substantially all the luminance vertical details, up to the cutoff frequency of filter 36, of a portion of NTSC signal that was coupled to terminal 11 during the current active video line time of NTSC signal 130.

$Y_a$ signal and $Y_b$ signal are coupled to input terminals 23a and 23b, respectively, of a speed-up processor 23 that operates similarly to speed-up processor 19 or 21. In general, speed-up block 23, for example, may include four delay lines, each providing one horizontal line time delay, which are clocked-in at the four-times the color subcarrier rate (4 sc) and read out by a commutation process at eight times the subcarrier rate (8 sc). Thus, the output from speed-up block 23 is continuous video at two-times the horizontal line frequency producing a twice rate $Y_{2H}$ signal.

During each horizontal video line time of 63.5 microseconds of NTSC signal 130, a video line of time compressed signal $Y_a$ alternates with a video line of time compressed signal $Y_b$ to provide luminance information for display in a pair of immediately consecutive non-interlaced scan lines, respectively. During each 63.5 microsecond, signal $Y_{2H}$ includes two signal portions that contain the luminance information of $Y_a$ and $Y_b$ signals, respectively, in two consecutive time slots, each of $63.5/2 \sim 31.7$ microseconds duration.

In each 63.5 microseconds of the horizontal video line time of NTSC signal 130, signal $I_{2H}$, that is the I signal speeded up in speed-up processor 19, includes two signal portions that provide I picture information for display in a pair of immediately consecutive non-interlaced scan lines, respectively. Simultaneously, signal $Q_{2H}$, that is the Q signal speeded up in speed-up processor 21, includes two signal portions that provide Q picture information for display in the pair of immediately consecutive scan lines, respectively. Signal $Q_{2H}$ is combined in an I,Q,Y matrix 43 with signals $I_{2H}$ and $Y_{2H}$ on a non-interlaced, line-by-line basis, in a known manner, to form time-compressed R, G and B signals. The information contained in the time-compressed R,G,B signals is displayed on the screen of display 51 by means of, for example, a progressively scanned raster display.

As disclosed in the Pritchard et al. application, herein incorporated by reference, the gain factor K of gain controlled devices 41 and 35, respectively, may be such that vertical peaking is produced in $Y_a$ signal and in $Y_b$ signal, respectively. It should be understood that the gain factor K of gain controlled device 41 may be different from that of gain controlled device 35. If K is greater than 1 in device 41 or 35, transitions in the vertical direction "overshoot" in comparison to the situation in which $K=1$. This enhancement of vertical details may provide for a more subjectively pleasing picture.

In accordance with one aspect of the invention, vertical detail enhancement that is achieved, as explained before, by coupling vertical detail representative signal Yd through gain controlled devices 41 and 35, respectively, to the respective input terminal of subtractor 39 and adder 33, respectively, is reduced in the presence of motion.

Vertical detail representative signal Yd is also coupled to a motion detector 37 that produces a motion signal M in response to motion in NTSC signal 130. Motion signal M provides, illustratively, a constant level output during each frame time of NTSC signal 130 outside the vertical blanking interval. The voltage level of signal M in each frame time is indicative of the degree of motion in the picture scene. Motion detector 37 is described later on in detail. It should be understood that other motion detectors may be suitable, such as the known motion detector that utilizes a frame or field store. In the known motion detector, corresponding video lines of NTSC 130 from different frames are compared for identifying motion when the respective video lines do not match. Motion signal M controls the gain factor K of gain control devices 41 and 35, respectively.

Figure 4:
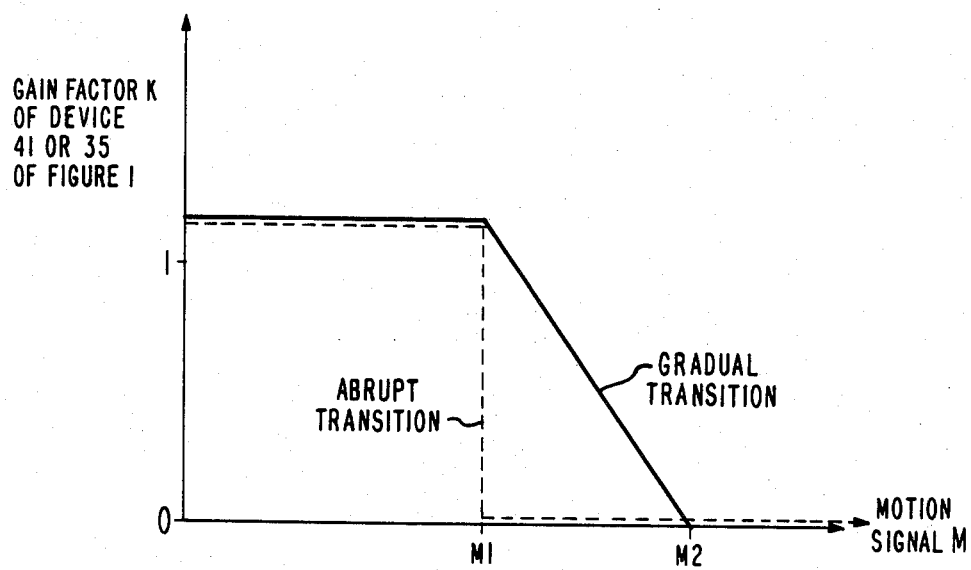
FIG. 4 illustrates two examples of the dependency between the gain factor K of one of the gain controlled devices used in the apparatus of FIG. 1 and the motion indicative signal.

FIG. 4 illustrates two examples of the dependency of gain factor K of each of gain controlled devices 35 and 41 on motion signal M. In the first example that is illustrated by the dashed line in FIG. 4, K assumes one of two possible states. When motion signal M exceeds a threshold level M1, K is equal to zero. Otherwise, it is equal to a predetermined value, such as $K>1$. Here K exhibits an abrupt change between the two states. In the second example that is illustrated by the solid line, the gain factor K decreases gradually when M exceeds a threshold level M1. Threshold level M1, in the two examples, is established to minimize the effects of noise. When motion signal M exceeds level M1, in the first example, or level M2 in the second example, vertical detail enhancement is omitted. On the other hand, when motion signal M is at a level that is lower than M1, as illustrated in FIG. 4, corresponding to no substantial degree of motion in the picture scene, the enhancement of vertical detail is at a maximum.

As explained before, vertical detail enhancement is omitted or diminished under motion conditions in order to reduce the visibility of artifacts that are attributable to aliasing components in NTSC signal 130 produced at the source of NTSC signal 130. It should be understood that the function, representing the variations of gain factor K of devices 41 or 35, or of both, relative to motion signal M, may be chosen to provide a tradeoff between the extent of reduction of the aliasing component induced artifacts and the extent of picture sharpness in the presence of motion.

FIG. 2a illustrates the well-known frequency spectrum of NTSC signal 130 of FIG. 1 representing a stationary picture. Note that in the vicinity of odd multiples of one-half the horizontal line frequency $f_H=15734$ KHz, of incoming NTSC signal 130, there is negligible spectral content; whereas spectral energy may appear at an integer or zero multiple of the frequency $f_H=15734$ KHz and at sidebands spaced by multiples of the frame rate of 30 Hz above and below. Also note that in The absence of motion, the first sideband may appear at 30 Hz. The energy in the sidebands that are further away from a given multiple of $f_H$ is reduced, for example, in exponential manner.

FIG. 2b illustrates the frequency spectrum of NTSC signal 130 of FIG. 1 representing a non-stationary picture. In contrast to the situation illustrated in FIG. 2a, here the spectral content of sidebands that are further away from a given multiple of $f_H$ is not negligible. For example, the spectral content in the vicinity of odd multiples of one-half the horizontal scanning frequency is not negligible. In addition, sidebands appear in frequencies that are not present for a stationary picture; for example, spectral content appears between $f=0$ and $f=30$ Hz. The concept behind motion detector 37 of FIG. 1 is that motion signal M is made to be indicative of the spectral content that is created as a result of motion. For example, the presence of energy in a portion of the spectrum of NTSC signal 130 between $f=0$ and $f=30$ Hz is indicative of motion.

FIG. 3a illustrates an example of motion detector 37 of FIG. 1, as described in detail in U.S. Ser. No. 607,122 filed May 3, 1984, entitled, MOTION DETECTOR THAT EXTRACTS MOTION INFORMATION FROM SIDEBANDS OF BASEBAND TELEVISION SIGNAL, in the name of D. H. Pritchard and filed concurrently herewith. FIGS. 3b and c illustrate timing diagrams helpful in explaining motion detector 37 of FIG. 3a. Identical numbers in FIGS. 1 and 3a-c indicate similar items or functions. In FIG. 3a, vertical detail signal Yd that is combed is coupled through a wiper k of a switch 55 and through a low pass filter 52, having a cutoff frequency of illustratively 30 Hz, the vertical rate, to form motion sidebands representative signal Sm at a terminal 52a. Note that signal Yd contains no component at zero frequency because of the combing process that is accomplished in separator 15.

Figure 5:
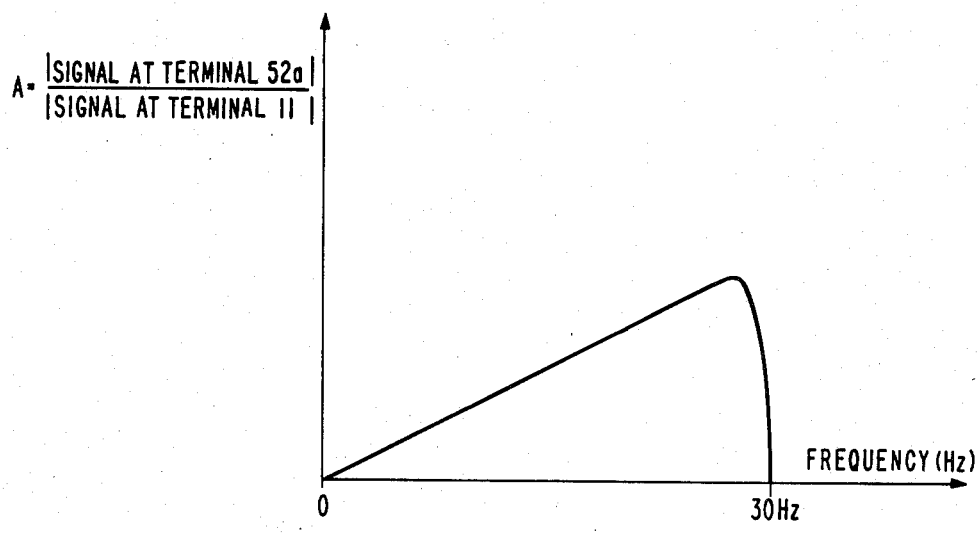
FIG. 5 illustrates an example of a transfer function A of a filter circuit of FIG. 1, as a function of frequency.

FIG. 5 illustrates a transfer function A representing the ratio, as a function of frequency, between the absolute values of the input signal at terminal 52a of FIG. 3a and that of the signal at terminal 11 of FIG. 1. From FIG. 5 it is apparent that only the low end of the spectrum of NTSC signal 130 of FIG. 1 is coupled to terminal 52a of FIG. 3 to form signal Sm. Because spectral content of NTSC signal 130 of FIG. 1 between f=0 and f=30 Hz appears only in the case of motion in the picture scene, the amplitude of signal Sm is indicative of motion in the picture scene.

Signal Sm is coupled to a peak detector 53 that produces a signal Smp that is indicative of the absolute value of the peak voltage of signal Sm. Signal Smp is coupled to a sample and hold circuit 54 that stores the level of signal Smp at the beginning of every other vertical retrace period to produce motion signal M, as illustrated by the dashed lines in FIG. 3b. Each of sample and hold circuit 54 and peak detector 53 of FIG. 3a may be controlled by pulses 21b of FIG. 3a that occur at the beginning of every other vertical retrace period, as illustrated in FIG. 3c. Pulses 21b may be derived from vertical blanking interval pulses $V_{bi}$, conventionally derived. Pulses $V_{bi}$ are illustrated schematically by the pulses 21a and b in FIG. 3c. Pulses $V_{bi}$ are coupled through a flip-flop 56 of FIG. 3a to provide one pulse 21b for every pair of pulses $V_{bi}$.

Peak detector 53 may include a capacitor, not illustrated in FIG. 3a, that is charged to the absolute value of the peak voltage of signal Sm during each period of 1/30 of a second and that is discharged under the control of pulse 21b, as illustrated by the solid lines in FIG. 3b. Thus the voltage of signal Smp of FIG. 3a and b may represent the peak voltage of signal Sm during the preceding 1/30 of a second. Detector 37 of FIG. 3a extracts motion information from sidebands of NTSC signal 130 between f=0 and f=30 Hz. Pulses 21b appear every 1/30 of a second, which is sufficient time for obtaining the peak voltage of the sidebands below f=30 Hz to produce signal Smp. These sidebands are indicative of motion because only non-stationary picture scene causes NTSC signal 130 to contain sidebands between f=0 Hz and f=30 Hz.

Switch 55 of FIG. 3a blocks NTSC signal 130 during each vertical blanking interval from being coupled to low pass filter 52. This is done under the control of vertical blanking interval pulse $V_{bi}$ to cause only active picture video lines to affect motion signal M.

In known motion detectors that utilize field or frame stores, video lines of consecutive fields or frames are directly and simultaneously compared or subtracted to form a motion signal. Such direct simultaneous operation between two video lines that are separated by a field time or by a frame time is not required in motion detector 37 of FIG. 3a. Motion detector 37 of FIG. 3a extracts motion information from sidebands that appear only when motion occurs. Because motion information is obtained from the frequency spectrum of NTSC signal 130 of FIG. 1, a simple, inexpensive motion detector 37 of FIG. 3a may be used that requires no direct simultaneous operation between video lines that are a field or a frame apart. Thus, motion detector 37 is simpler than motion detector that utilizes a frame store or a field store.

What is claimed is:

1. A television apparatus for processing a television signal that provides picture information suitable for display in a plurality of display lines comprising:
   first filter means for filtering said television signal for producing a luminance component signal;
   second filter means for filtering said television signal for producing a vertical detail representative signal;
   motion detector means responsive to said television signal for producing a motion indicative signal; and
   combining means responsive to said motion indicative signal for combining said vertical detail signal and said luminance signal to form a processed luminance output signal that contains a vertical detail component which varies inversely with motion in the picture.

2. The television apparatus as recited in claim 1 wherein said first filter means comprises a line comb filter of the line addition type for providing said luminance component signal and wherein said second filter means comprises a cascade connection of a line comb filter of the line substraction type and a low pass filter for providing said vertical detail signal.

3. A television apparatus for processing a television signal that provides picture information suitable for display in a plurality of display lines comprising:
   means responsive to said television signal for producing a first signal that is representative of a first component signal;
   means responsive to said television signal for producing a picture detail signal that is representative of picture detail;
   means responsive to said television signal for producing a signal that is indicative of motion in the picture;
   means responsive to said motion indicative signal for proportionately combining in accordance with said motion indicative signal said picture detail signal and said first signal to form a second signal that contains enhanced picture detail of said first component signal in accordance with motion in the picture; and wherein
   said picture detail signal producing means includes means for delaying said television signal by one video line time and means for subtractively combining the delayed and undelayed television signals.

4. The television apparatus as recited in claim 3 wherein said picture detail signal producing means further comprises, a filter responsive to the output of said subtractively combining means to form said picture detail signal wherein the amplitude of a second component signal of said television signal at the output of said filter is substantially reduced.

5. The television apparatus as recited in claim 3 wherein said motion indicative signal producing means includes a filter for extracting a portion of the frequency spectrum of said television signal that contains substantial spectral information only when motion occurs in the picture scene.

6. The television apparatus as recited in claim 5 wherein the extracted portion of the frequency spectrum of said television signal is between zero and the lowest sideband of said television signal that occurs when said television signal contains picture information representing a stationary picture.

7. The television apparatus as recited in claim 6 wherein said motion indicative signal producing means includes means responsive to the signal that is extracted by said extracting filter for producing said motion indicative signal that varies in accordance with the amplitude of said first component signal in the extracted portion of the frequency spectrum.

8. A television apparatus for processing a television signal that provides picture information suitable for display in a plurality of display lines comprising:
means responsive to said television signal for producing a first signal that is representative of a first component signal;
means responsive to said television signal for producing a picture detail signal that is representative of picture detail;
means responsive to said television signal for producing a signal that is indicative of motion in the picture; and
means responsive to said motion indicative signal for proportionately combining in accordance with said motion indicative signal said picture detail signal and said first signal to form a second signal that contains enhanced picture detail of said first component signal in accordance with motion in the picture; and wherein
said combining means proportionately adds said picture detail and first signals in accordance with said motion indicative signal to form said second signal that contains enhanced picture detail of a first polarity; and
second combining means for proportionately subtracting said picture detail and first signals in accordance with said motion indicative signal to form a third signal that contains enhanced picture detail of the opposite polarity.

9. The television apparatus as recited in claim 8 further comprising, means responsive to said second and third signals for compressing the time duration of a given video line of each of said second and third signals to that of the time duration required for displaying thereof in a display line, and means for displaying the picture information of time compressed video lines of said second and third signals, in alternate display lines, respectively, to obtain a non-interlaced display.

10. The television apparatus as recited in claim 8 wherein said third signal producing means is responsive to said motion indicative signal for proportionately subtracting in accordance therewith said picture detail and first signals to form said third signal.

11. A color television system for producing a progressively scanned image, comprising:
a source of a television signal representing luminance information and chrominance information of an image raster-scanned at a first rate in an interlaced fashion;
first separating means, responsive to said television signal, for separating said television signal into first and second signal components, said first signal component being representative of said luminance information with reduced low frequency vertical detail information and said second signal component including said chrominance information;
second separating means responsive to said second signal component for extracting from said second signal component spectral components including low frequency vertical detail information;
means coupled to said second separating means for inserting said low frequency vertical detail information into said first signal component;
means for time-compressing the video lines of said first and second signal components and for doubling the number of time compressed lines for displaying non-interlaced luminance and chrominance information on a raster; and
a motion detector for producing a signal indicative that the picture contained in said television signal is non-stationary, wherein said inserting means is responsive to said motion indicative signal for inserting said low frequency vertical detail information in accordance with said motion indicative signal.

12. The system according to claim 11 wherein said second separating means includes a low pass filter for low pass filtering said second signal component to eliminate chrominance information.

13. The system according to claim 12 wherein said inserting means includes an adder that receives said low frequency vertical detail information and said first signal component.

14. A color television system for producing a progressively scanned image, comprising:
a source of television signals representing luminance information and chrominance information of an image raster-scanned at a first rate in an interlaced fashion;
first separating means coupled for receiving said television signal for separating said television signals into first and second signal components, said first signal component representing a first portion of said luminance information having a frequency spectrum with signal energy concentrated in the vicinity of integer multiples of said first rate and nulls of signal energy in the vicinity of odd integer multiples of one-half of said first rate and said second signal component representing a second portion of said luminance information and said chrominance information having a frequency spectrum with signal energy concentrated in the vicinity of odd integer multiples of one-half of said first rate and nulls of signal energy in the vicinity of integer multiples of said first rate;
second separating means coupled for receiving said second signal component for recovering spectral components of said second signal component including said second portion of said luminance information;
means coupled for receiving said first signal component and said recovered spectral component of said second signal component for inserting vertical detail information by combining said second portion of said luminance information with said first portion of said luminance information;
time-compression means coupled for receiving said first and second signal components for time compressing and doubling the line rate of said television signals for displaying progressively scanned, non-interlaced luminance and chrominance information on a raster; and
a motion detector for producing a motion indicative signal providing information of motion in the picture scene, said motion indicative signal being coupled to said inserting means for controlling in accordance with said motion indicative signal the amplitude of said second portion of said luminance information that is combined with said first portion of said luminance signal.

15. The system according to claim 14 wherein said first separating means provides a video line that is an estimate of successive video lines of said source of television signals.

16. The system according to claim 15 wherein said second separating means includes a low pass filter for low pass filtering said second signal component to recover said vertical detail information.

17. The system according to claim 16 wherein said inserting means includes an adder for combining said low pass filtered second signal component with said first signal component.

* * * * *